United States Patent
Erickson et al.

(10) Patent No.: US 7,431,539 B2
(45) Date of Patent: Oct. 7, 2008

(54) CLAMP PIN TOOL HOLDER

(75) Inventors: Robert A. Erickson, Raleigh, NC (US); Paul A. Brown, Hostetter, PA (US)

(73) Assignee: Kennametal Inc., Latrobe, PA (US)

( * ) Notice: Subject to any disclaimer, the term of this patent is extended or adjusted under 35 U.S.C. 154(b) by 236 days.

(21) Appl. No.: 11/158,553

(22) Filed: Jun. 22, 2005

(65) Prior Publication Data

US 2006/0291965 A1 Dec. 28, 2006

(51) Int. Cl.
*B23B 27/16* (2006.01)

(52) U.S. Cl. .................. 407/104; 407/107; 407/112

(58) Field of Classification Search ......... 407/107–109, 407/103–106, 112
See application file for complete search history.

(56) References Cited

U.S. PATENT DOCUMENTS

| | | | | |
|---|---|---|---|---|
| 3,491,421 A | * | 1/1970 | Holloway | .................... 407/105 |
| 3,683,473 A | * | 8/1972 | Joynson | .......................... 407/4 |
| 3,787,941 A | * | 1/1974 | Novkov | ...................... 407/105 |
| 3,815,195 A | * | 6/1974 | McCreery | .................... 407/105 |
| 4,030,176 A | * | 6/1977 | Michonski | .................. 407/107 |
| 4,244,666 A | | 1/1981 | Erickson et al. | |
| 4,456,409 A | * | 6/1984 | Burmeister | .................. 407/104 |
| 4,632,593 A | | 12/1986 | Stashko | |
| 6,158,928 A | | 12/2000 | Hecht | |
| 6,582,162 B2 | | 6/2003 | Shiraiwa | |
| 6,599,060 B2 | * | 7/2003 | Hecht | .......................... 407/102 |
| 6,918,717 B2 | * | 7/2005 | Ben-Mucha | ................ 407/103 |
| 2003/0165362 A1 | | 9/2003 | Hecht | |

FOREIGN PATENT DOCUMENTS

EP 161505 11/1985

* cited by examiner

*Primary Examiner*—Boyer D. Ashley
*Assistant Examiner*—Sara Addisu
(74) *Attorney, Agent, or Firm*—Larry R. Meenan (57) ABSTRACT

A clamp pin tool holder for clamping an insert in a tool holder includes a bore for receiving a clamp pin and a bore for receiving a lock screw. The clamp pin includes a cam portion with angled surfaces. The lock screw is rotatably mounted to the bore of the tool holder and includes angled surfaces for engaging the angled surfaces of the clamp pin. When the lock screw is rotated in one direction, one angled surface on the lock screw and one angled surface on the clamp pin engage each other an acts as a conical wedge to cause the clamp pin to move relative to the lock screw. When the lock screw is rotated in the opposite direction, another angled surface on the lock screw engages a different angled surface on the clamp pin in a similar manner to cause the clamp pin to move in an opposite direction.

19 Claims, 13 Drawing Sheets

FIG. 14

CLAMP PIN TOOL HOLDER

BACKGROUND OF THE INVENTION

In the past, an insert was clamped within a pocket of a tool holder by using a lock pin in combination with a top clamp. More recently, top clamps that have a segment for engaging the hole in the insert have been utilized to secure the insert within the pocket. While these top clamp/pin combinations offer the advantage of needing only a single tool, such as a wrench, to clamp the insert, they offer the disadvantage of providing a structure that obstructs the chip flow. Thus, there is a need to provide a structure and method for securely holding an insert within a pocket of a tool holder while minimizing chip flow obstruction.

On some machines, neutral or positive rake inserts are currently held in place with a special screw that is typically not accessible. On any machine, the screw is often lost during removal of the insert. Thus, there is a need to provide a tool holder that is designed to clamp either neutral or positive rake inserts, while allowing access from the front or back side of the tool holder (one of which are accessible on all machine applications) and by having no parts which are required to separate from the tool holder during insert change.

BRIEF SUMMARY OF THE INVENTION

Briefly, according to this invention, there is provided an apparatus and method for clamping an insert in a tool holder. The apparatus comprises a head portion including a first bore passing through a top surface and a bottom surface, and a second bore passing through a first side surface and a second side surface intersecting the first bore; a clamp pin including a clamp portion and a cam portion having a first angled surface and a second angled surface, a portion of the clamp pin being positioned within the first bore; and a lock screw movably mounted within the second bore and including a first angled surface and a second angled surface for engaging the first and second angled surfaces of the clamp pin. Rotating the lock screw in a first direction causes the first angled surface of the lock screw to engage the first angled surface of the clamp pin and act as a first cam surface to move the clamp portion of the clamp pin in a direction downward and toward the insert. Rotating the lock screw in a second direction causes the second angled surface of the lock screw to engage the second angled surface of the clamp pin and act as a second cam surface to move the clamp portion of the clamp pin in a direction upward and away from the insert.

In another aspect of the invention, a clamp pin tool holder comprises a head portion including an insert pocket for receiving an insert; a clamp pin including a clamp portion and a cam portion having a first angled surface and a second angled surface, a portion of the clamp pin being positioned within a bore of the head portion; and a lock screw rotatably mounted to the head portion, the lock screw including a first angled surface and a second angled surface for engaging the first and second angled surfaces of the clamp pin. Rotating the lock screw in a first direction causes relative movement between the clamp pin and the lock screw such that the first angled surface of the lock screw engages the first angled surface of the clamp pin and moves the clamp portion of the clamp pin downward and toward the insert, thereby placing said tool holder in a clamped position. Rotating the lock screw in a second, opposite direction causes relative movement between the clamp pin and the lock screw such that the second angled surface of the lock screw engages the second angled surface of the clamp pin and moves the clamp portion of the clamp pin in a direction upward and away from the insert, thereby placing the tool holder in a released position.

In yet another aspect of the invention, a device for clamping an insert within an insert pocket of a tool holder comprises a head portion; a clamp pin including a clamp portion and a cam portion having at least one angled surface a portion of the clamp pin being positioned within a bore of the head portion; and a lock screw rotatably mounted to the head portion, the lock screw including at least one angled surface for engaging the at least one angled surface of the clamp pin. Rotating the lock screw in a first direction causes the lock screw to move in a transverse direction with respect to the clamp pin such that the at least one angled surface of the lock screw engages the at least one angled surface of the clamp pin to move the clamp portion of the clamp pin relative to the insert.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
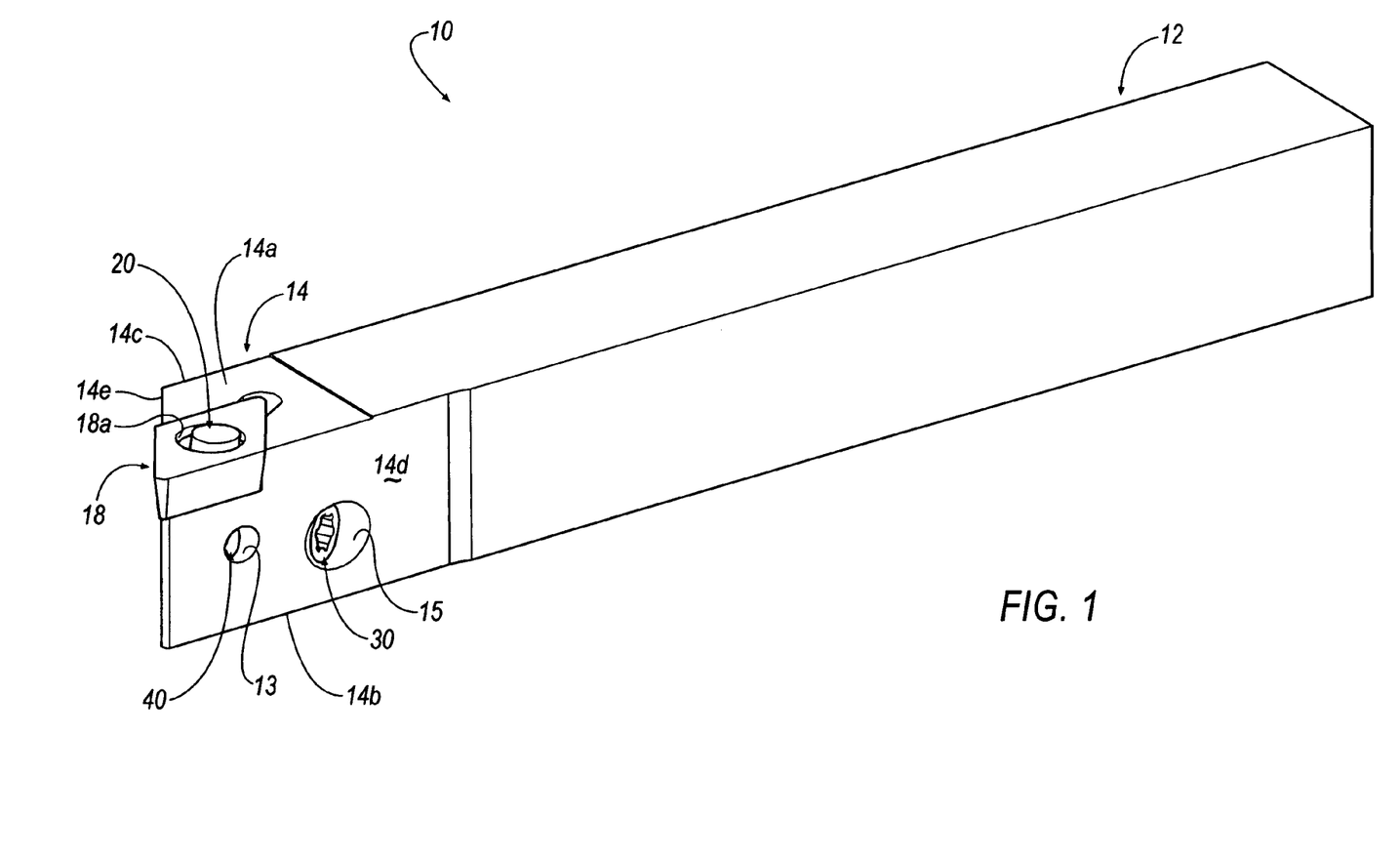
FIG. 1 is a perspective view of a clamp pin tool holder according to an embodiment of the invention.
Figure 2:
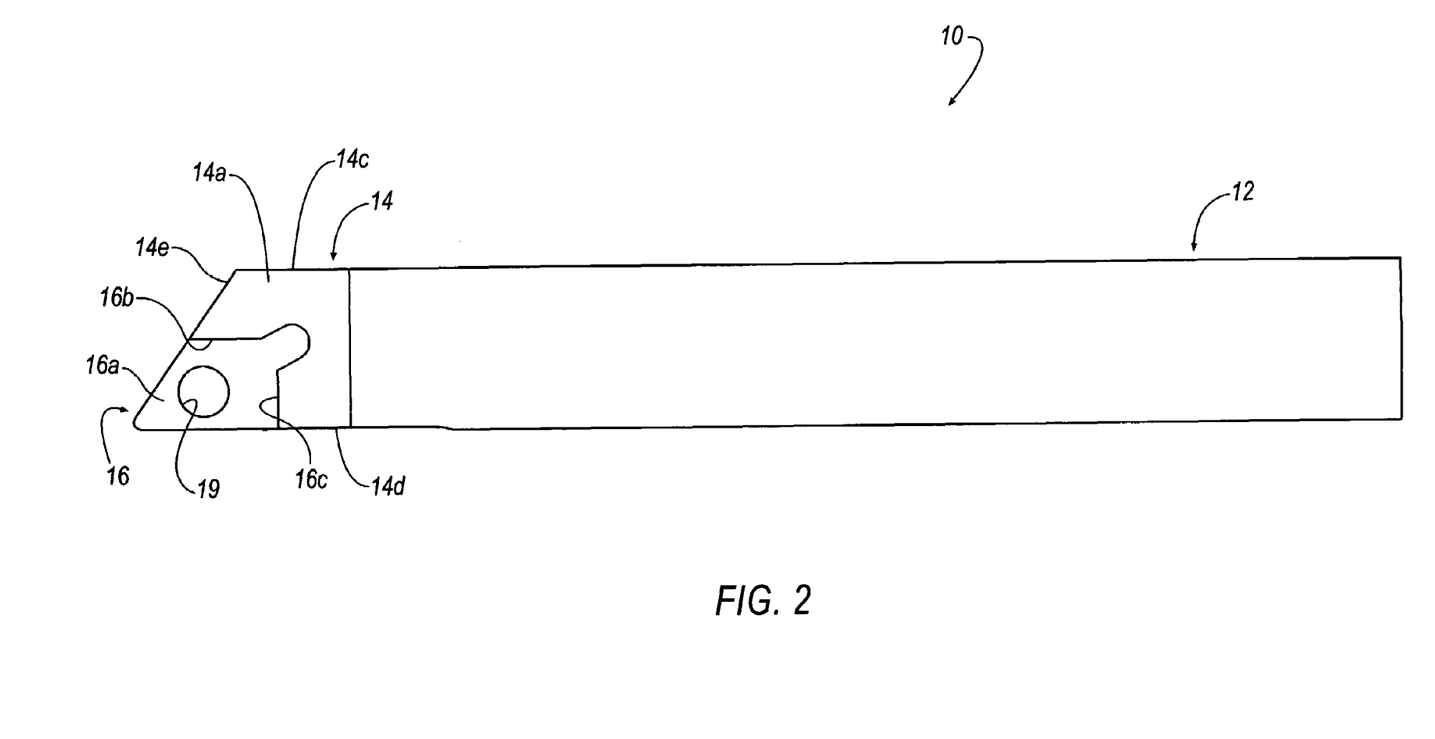
FIG. 2 is a top view of the clamp pin tool holder of FIG. 1 with the insert and clamp pin removed for clarity.
Figure 3:
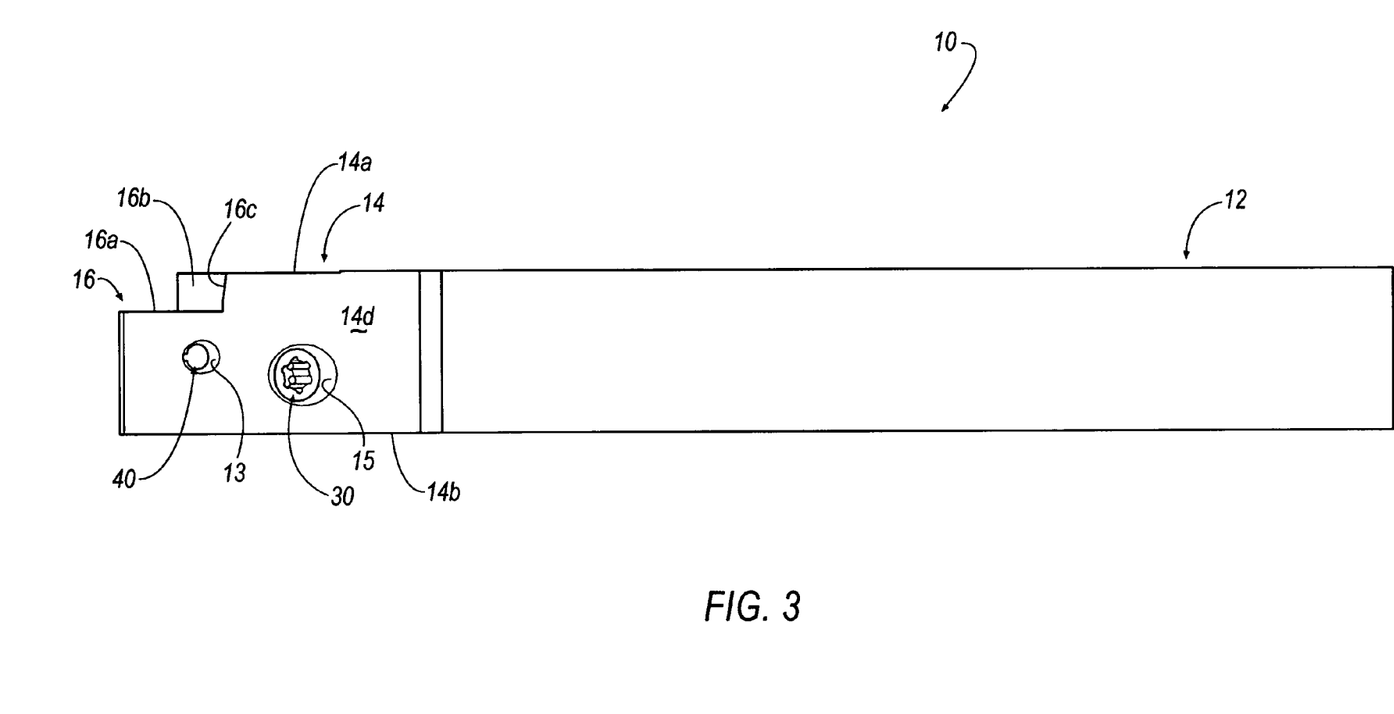
FIG. 3 is a side view of the clamp pin tool holder of FIG. 1 with the insert and clamp pin removed for clarity.
Figure 4:
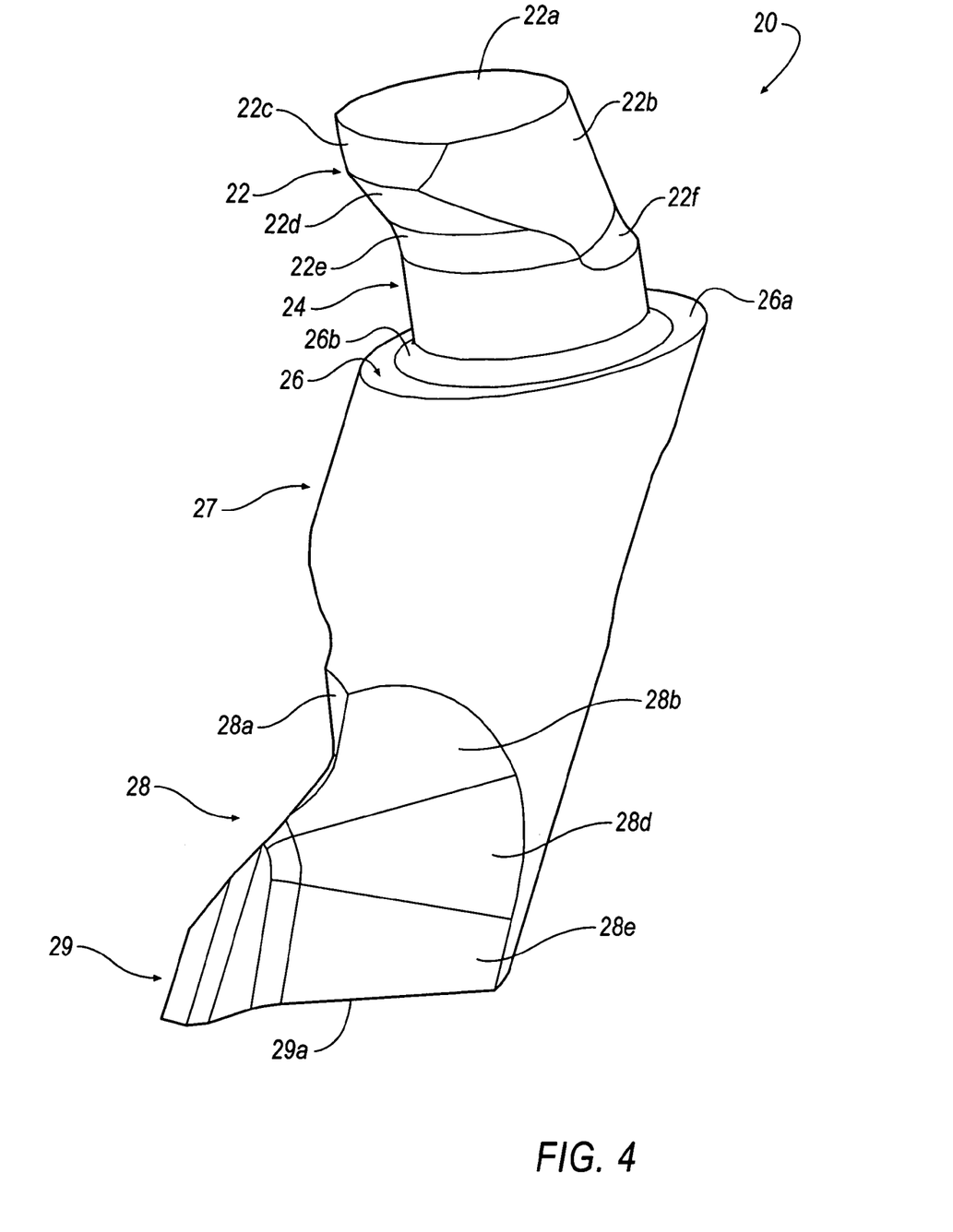
FIG. 4 is a perspective view of the clamp pin according to an embodiment of the invention.
Figure 5:
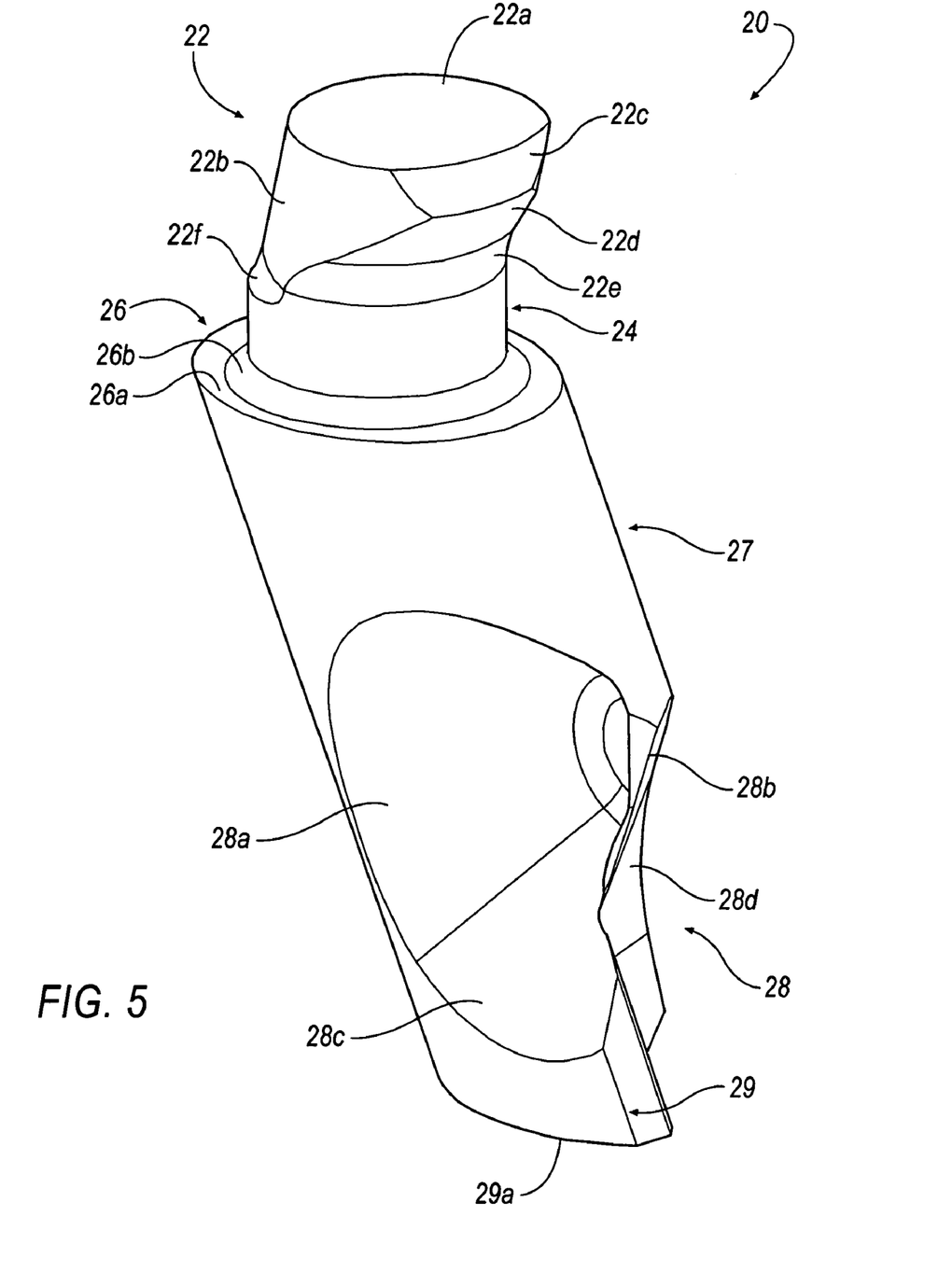
FIG. 5 is another perspective view of the clamp pin according to an embodiment of the invention.

Referring to the drawings, wherein like reference characters represent like elements, FIGS. 1-3 show a clamp pin tool holder, shown generally at 10, according to an embodiment of the invention. The tool holder 10 includes a generally rectangular or square-shaped shank portion 12 and a head portion 14 that includes a top surface 14a, a bottom surface 14b, a first side surface 14c, an opposite second side surface 14d, and a third side surface 14e that may be formed at an angle with respect to with respect to the side surfaces 14c, 14d.

The head portion 14 also includes an insert pocket 16 defined by a seat surface 16a, a first side surface 16b and a second side surface 16c. An insert 18 having a bore 18a is received and supported by the seat surface 16a and side surfaces 16b, 16c of the insert pocket 16 when mounted in the tool holder 10. In this manner, the insert 18 is held by a two-point contact defined by the side surfaces 16b, 16c and the seat surface 16a when the insert 18 is pulled back and down while being placed from a released position to a clamped position. The head portion 14 also includes an aperture or bore 19 that extends from the seat surface 16a to the bottom surface 14b. As shown in FIG. 2, the bore 19 may be generally round or circular in shape that corresponds to the shape of the clamp pin 20 and having a sufficient diameter to allow clearance for forward and backward movement of the clamp pin 20 within the bore 19. It will be appreciated that the invention is not limited by the shape of the bore 19 and the clamp pin 20, and that the invention can be practiced with any desirable corresponding shapes for the bore 19 and the clamp pin 20. For example, the bore 19 and the clamp pin 20 may be oval, rectangular, square, and the like. A passageway 13 extends laterally from the side surface 14d to the angled side surface 14e such that a portion of the passageway 13 may intersect the bore 19 at a substantially perpendicular angle.

A threaded bore 15 extends from the side surface 14d to the side surfaces 14c, 14e. The threaded bore 15 is formed in the head portion 14 at an angle with respect to the side surface 14d and may be formed generally parallel to the passageway 13. In the illustrated embodiment, the centerline of the threaded bore 15 for the lock screw 30 does not intersect the centerline of the bore 19 for the clamp pin 20. That is, the centerline of the threaded bore 15 and the centerline of the bore 19 are offset from one another. Because the centerline of the threaded bore 15 for the lock screw 30 is offset from the centerline of the bore 19 for the clamp pin 20, the threaded bore 15 can be placed behind the bore 19 for the clamp pin 20 in an area of the tool holder 10 that has more space for the threaded bore 15. This allows for smaller components as well as optimum placement of those components. If the centerline of the threaded bore 15 for the lock screw 30 was on the centerline of the body for the clamp pin 20, less space would be available for the location of the threaded bore 15 for the lock screw 30. The tool holder 10 may also provided with a shim (not shown) of a type well-known in the art interposed between the insert 18 and the seat surface 16a.

Referring now to FIGS. 4-7, the tool holder 10 includes a lock pin or clamp pin, indicated generally at 20, that is situated in the bore 19 formed in the head portion 14 of the tool holder 10. As illustrated, the clamp pin 20 is generally a C-shaped member (when viewed in FIGS. 6 and 7) having a sufficient length such that the clamp pin 20 is capable of extending the entire length from the bore 18a of the insert 18 to the bottom surface 14b of the head portion 14 of the tool holder 10. The clamp pin 20 includes a projection or clamp portion, shown generally at 22, that extends upwardly and laterally outwardly from a barrel portion 24 toward the insert 18. The clamp portion 22 includes a top surface 22a, a rounded rear surface 22b, a first faceted front surface 22c, and a second faceted front surface 22d. The first and second faceted front surfaces 22c, 22d are formed at an angle with respect to each other to conform to the contour of the bore 18a of the insert 18. In this manner, the clamp portion 22 positively and securely holds the insert 18 within the pocket 16 of the tool holder 10 when in the clamped position. The clamp portion 22 is generally circular-shaped in cross section having a smaller diameter than the diameter of the bore 18a of the insert 18 to allow sufficient clearance for removing the insert 18 from the tool holder 10 when in the released position (see FIG. 1). The barrel portion 24 may have a diameter slightly larger than the diameter of the clamp portion 22 of the clamp pin 20, but slightly smaller than the bore 18a of the insert 18. The clamp portion 22 may also include a front radius blend 22e transitioning between the faceted front surface 22d and the barrel portion 24, and a rear radius blend 22f transitioning between the rounded rear surface 22b and the barrel portion 24.

The barrel portion 24 terminates at a collar portion, shown generally at 26. The collar portion 26 includes a collar 26a and a radius blend 26b for providing a transition between the barrel portion 24 and the collar portion 26. The collar portion 26 is generally circular-shaped in cross section having a diameter slightly smaller than the diameter of the bore 19 of the head portion 14. The collar 26a of the collar portion 26 is substantially flush with the seat surface 16a when the tool holder 10 is placed in a clamped position, and extends slightly above the seat surface 16a when the tool holder 10 is placed in a released position.

Figure 6:
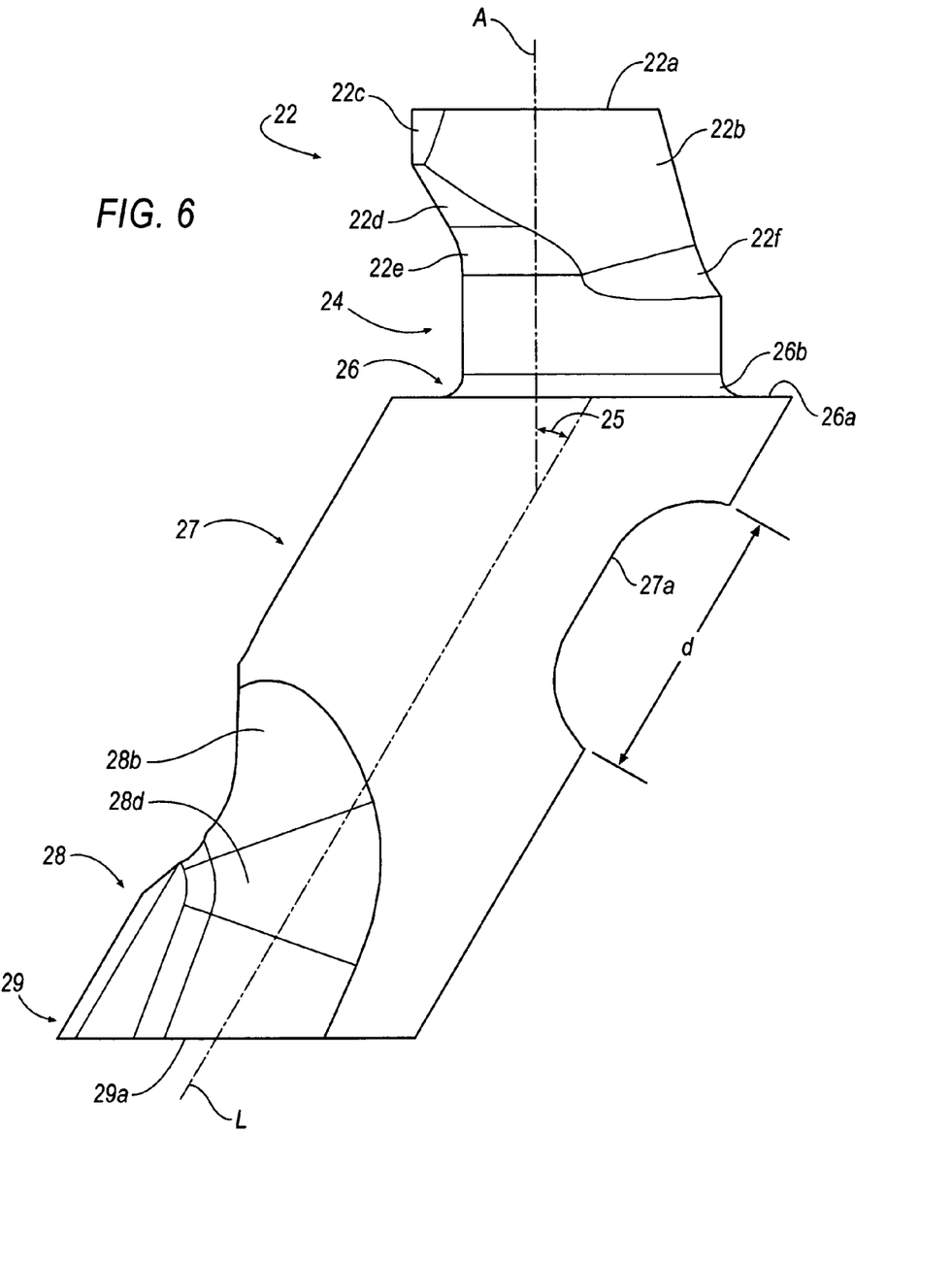
FIG. 6 is a side view of the clamp pin according to an embodiment of the invention.

The clamp pin 20 further includes a central body portion, shown generally at 27. The body portion 27 is generally circular-shaped in cross section with a diameter slightly smaller than the diameter of the bore 19 of the tool holder 10. As seen in FIG. 6, the body portion 27 includes a cutout portion 27a formed in the rear of the body portion 27 and having a dimension, d, extending along a longitudinal axis, L, of the clamp pin 20. A stop pin 40, such as a roll pin, dowel pin, and the like, resides within the passageway 13 of the head portion 14 of the tool holder 10 and at least partially resides within the cutout portion 27a of the body portion 27. Thus, the dimension, d, of the cutout portion 27 defines a length of travel of the clamp pin 20 within the bore 19. The longitudinal axis, L, of the body portion 27 is formed at an angle 25 with respect to an axis, A, of the clamp portion 22 and barrel portion 24 of the claim pin 20. In the illustrated embodiment, the angle 25 is in a range between about 0 degrees to about 60 degrees, for example, the angle 25 can be approximately 30 degrees. However, it will be appreciated that the invention is not limited by the relative angle 25 between the clamp portion 22 and the body portion 27, and that the invention can be practiced using any desired angle.

Figure 7:
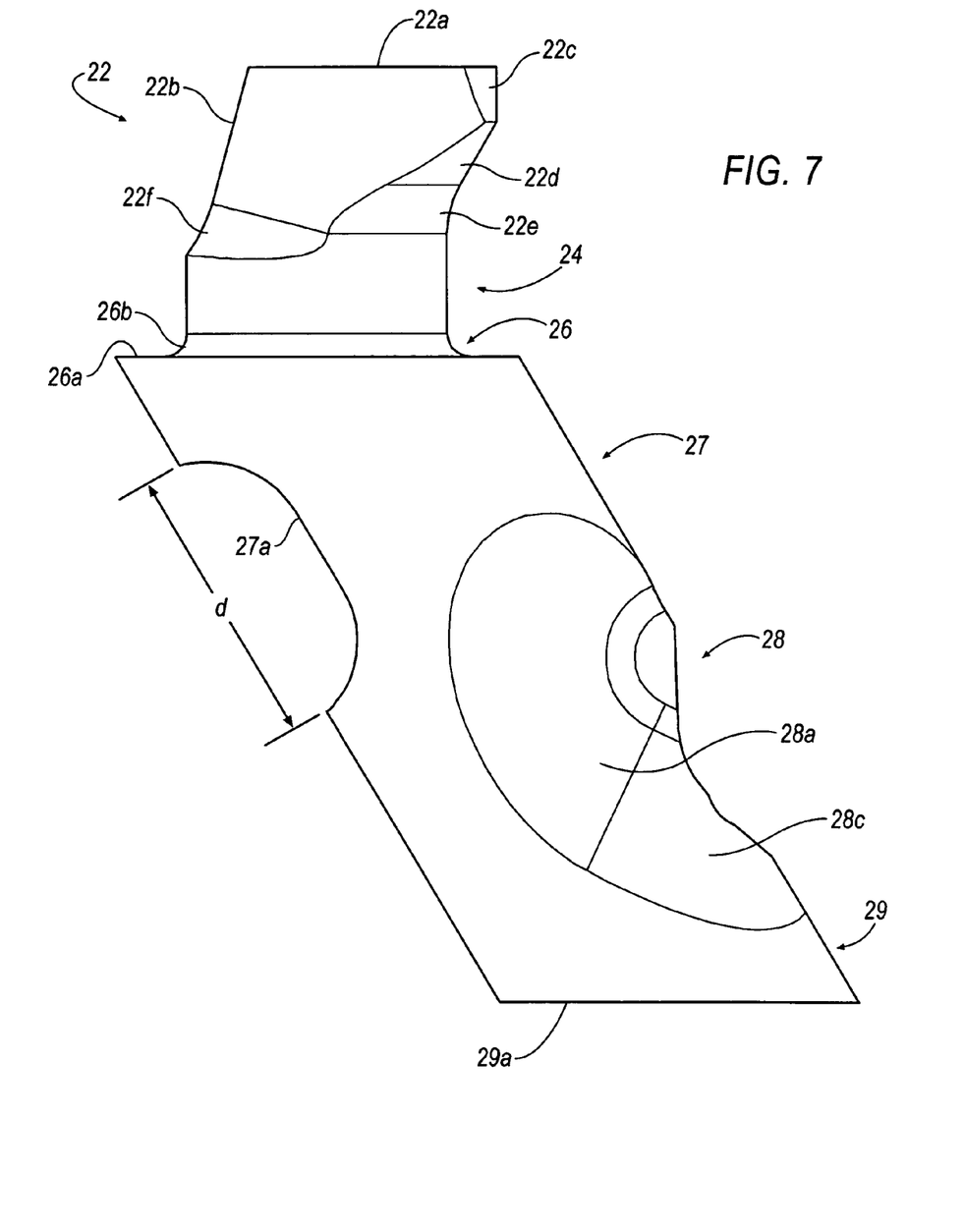
FIG. 7 is another side view of the clamp pin according to an embodiment of the invention.

The clamp pin 20 further includes a cam portion, shown generally at 28, that extends outwardly with respect to the body portion 27. The cam portion 28 includes a pair of upper angled surfaces 28a, 28b, and a pair of lower angled surfaces 28c, 28d that act a cam surfaces, as described in more detail below. The pair of upper angled surfaces 28a, 28b are at an angle in a range between approximately 20 degrees and approximately 140 degrees with respect to each other. In the illustrated embodiment, the upper angled surfaces 28a, 28b are at an angle of approximately 80 degrees with respect to each other. The curved rear of the cam portion 28 is substantially coplanar with the curved rear of the body portion 27, as shown in FIG. 7.

The clamp pin 20 further includes a nose portion, shown generally at 29. The curved front of the nose portion 29 is substantially coplanar with the curved front of the body portion 27, as shown in FIG. 7. The nose portion 29 includes a bottom surface 29a that is substantially parallel with the top surface 22a of the clamp portion 22.

Figure 8:
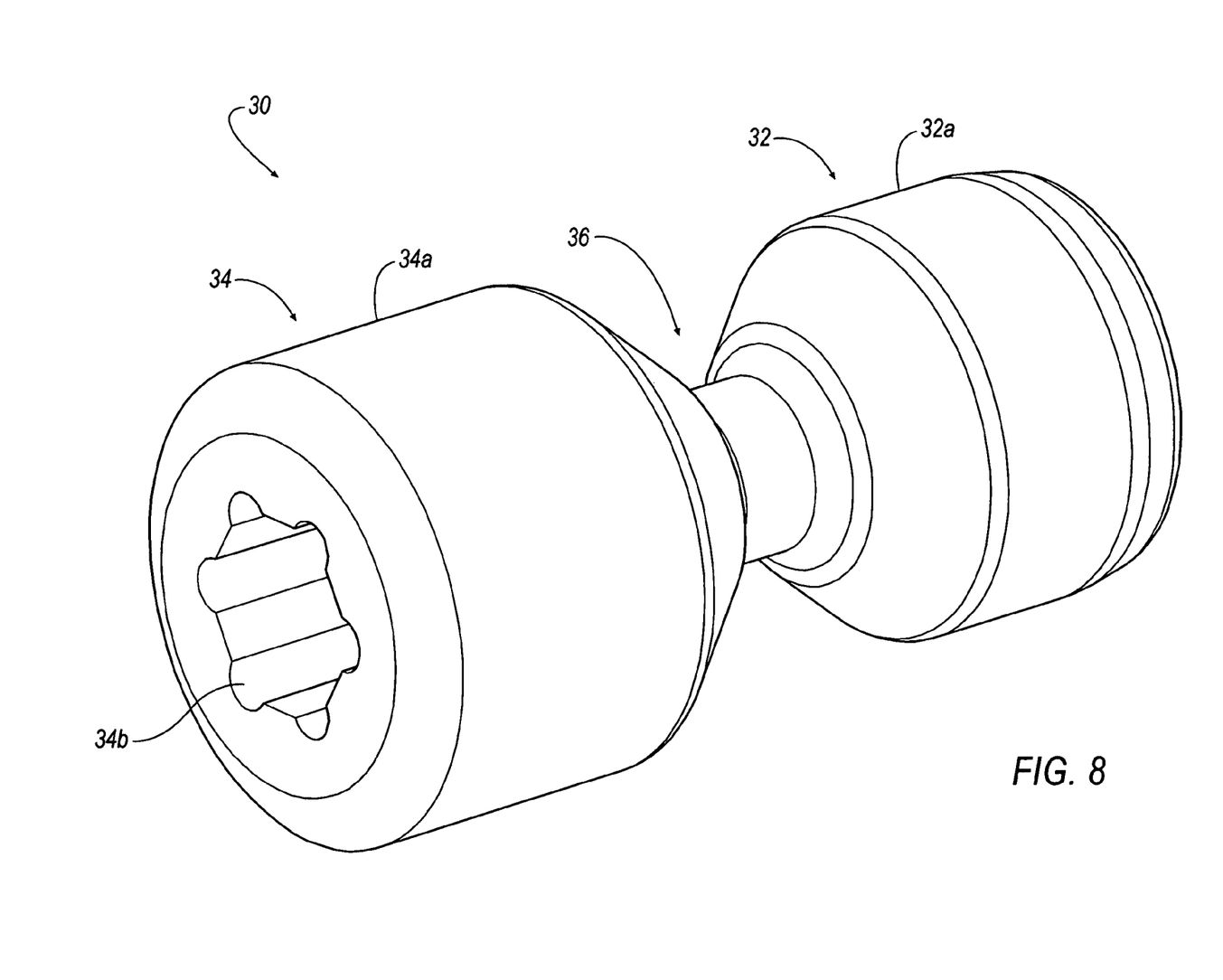
FIG. 8 is a perspective view of the lock screw according to an embodiment of the invention.
Figure 9:
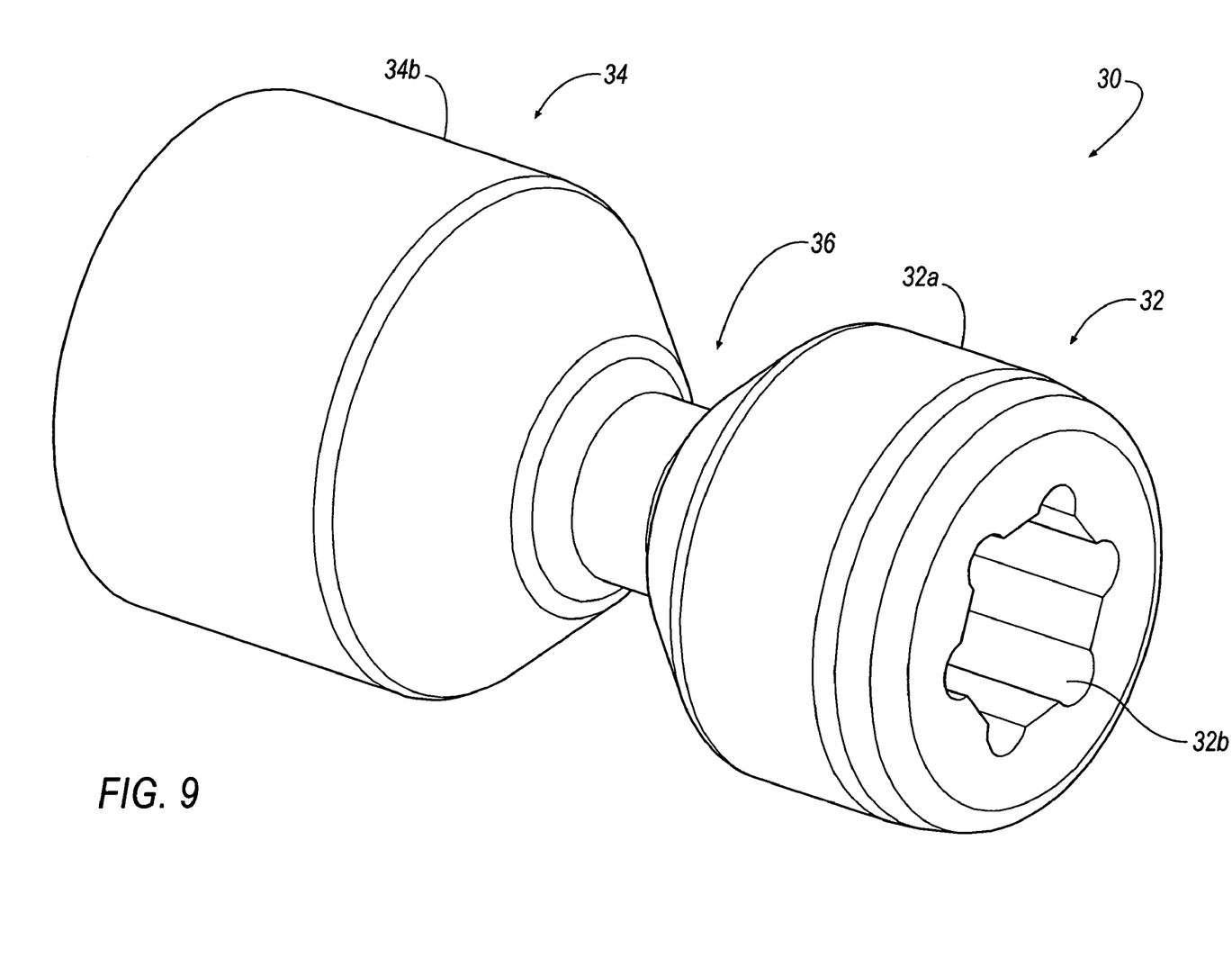
FIG. 9 is another perspective view of the lock screw according to an embodiment of the invention.
Figure 10:
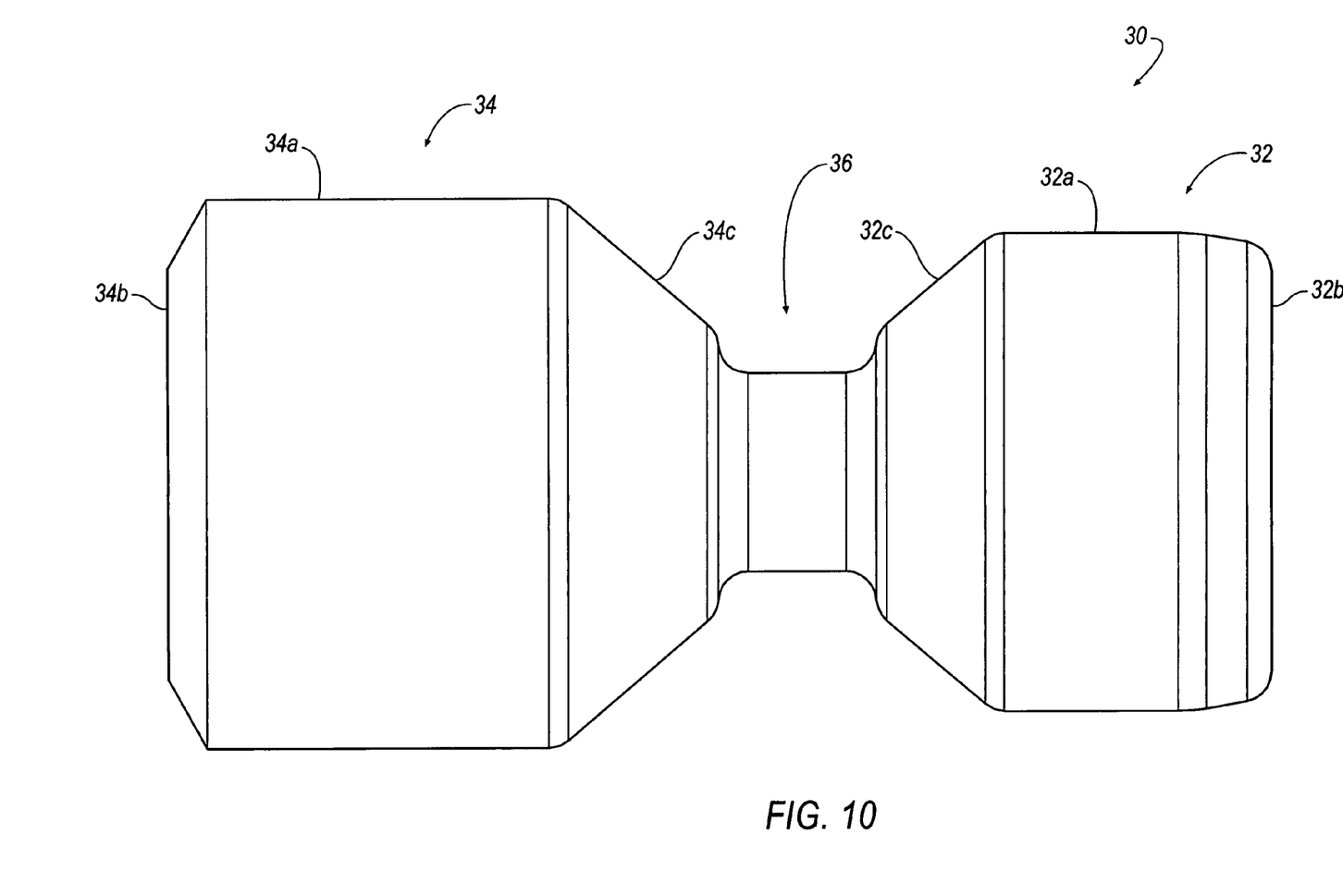
FIG. 10 is a side view of the lock screw according to an embodiment of the invention.

Referring now to FIGS. 8-10, the tool holder 10 further includes a lock screw, shown generally at 30. In general, the lock screw 30 comprises a pair of generally cylindrical portions 32, 34 separated by a generally cylindrical intermediate portion 36. Each cylindrical portion 32, 34 includes a body portion 32a, 34a having a substantially uniform diameter. In the illustrated embodiment, the body portion 32a has a slightly smaller diameter than the body portion 34a. However, it will be appreciated that the invention can be practiced in which the body portions 32a, 34a have the same diameter, or that the body portion 32a can have a larger diameter than the body portion 34a. In any event, the body portions 32a, 34a have a diameter that is larger than the intermediate portion 36. A socket 32b is provided at the end of the cylindrical portion 32, and a socket 34b is provided at the end of the cylindrical portion 34. The sockets 32b, 34b are adapted to receive an Allen wrench or other suitable tool for rotating the lock screw 30, as shown in FIGS. 8 and 9. It will be appreciated that the invention can be practiced using only one socket provided on only one cylindrical portion 32, 34.

When the tool holder 10 is assembled, the lock screw 30 is provided in the threaded bore 15 in the head portion 14, or alternatively in the shank portion 12. The access of the lock screw 30 from the side surface 14d of the tool holder 10 may be desirable in certain applications in which accessibility of one or more of the sockets 32b, 34b on the lock screw 30 is difficult.

Each cylindrical portion 32, 34 also includes an angled, conical surface 32c, 34c that tapers from the larger diameter body portions 32a, 34a to the smaller diameter intermediate portion 36. The surfaces 32c, 34c may be formed at approximately the same angle as the angled surfaces 28a, 28d of the clamp pin 20. For example, the surfaces 32c, 34c can be formed at an angle in a range between about 20 degrees and 140 degrees with respect to each other. In the illustrated embodiment, the surfaces 32c, 34c are formed at an angle of approximately 80 degrees with respect to each other. The surfaces 32c, 34c act as cam surfaces when engaging the upper angled surfaces 28a, 28b, and a pair of lower angled surfaces 28c, 28d of the cam portion 28 of the clamp pin 20.

Figure 11:
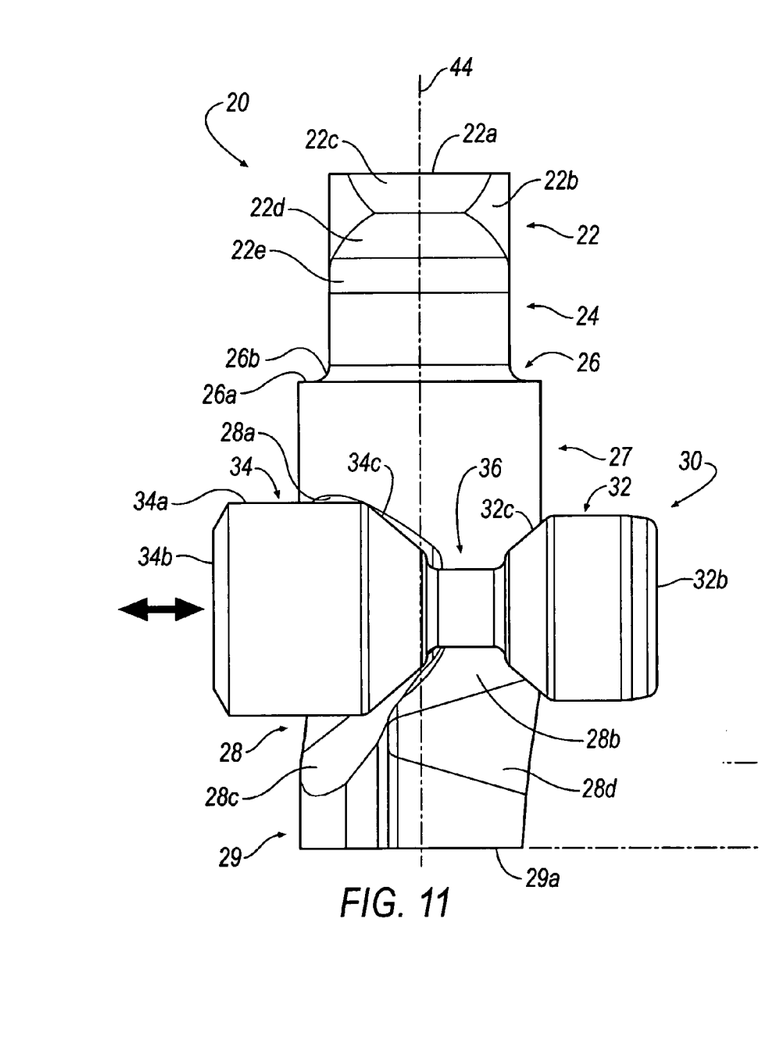
FIG. 11 is a front view of the clamp pin and lock screw according to an embodiment of the invention when the tool holder is in a clamped position.
Figure 12:
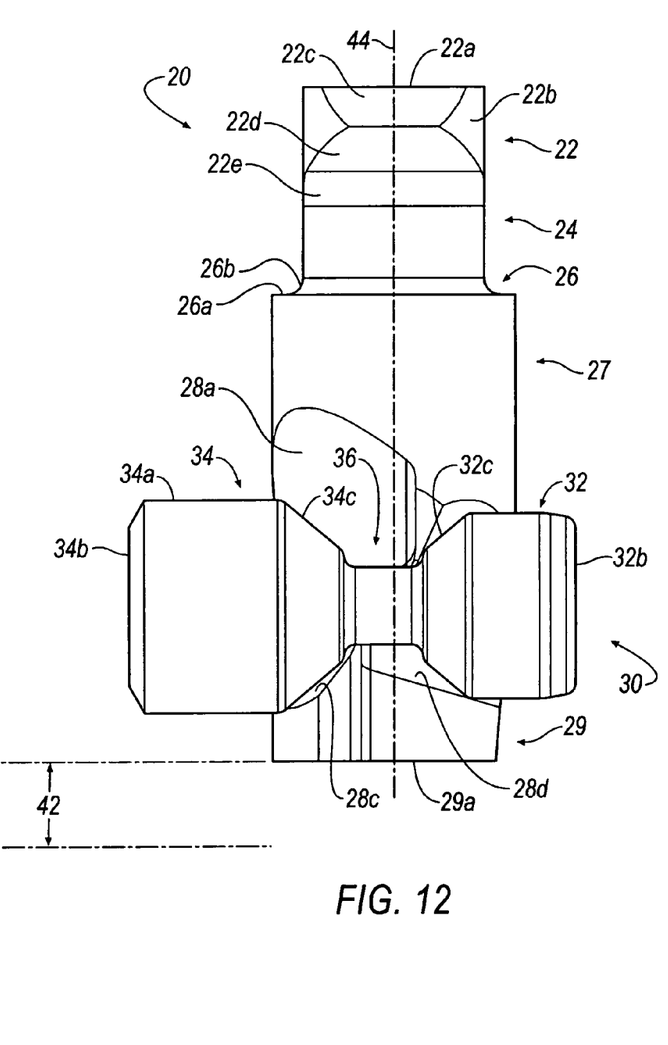
FIG. 12 is a front view of the clamp pin and lock screw according to an embodiment of the invention when the tool holder is in a released position.
Figure 13:
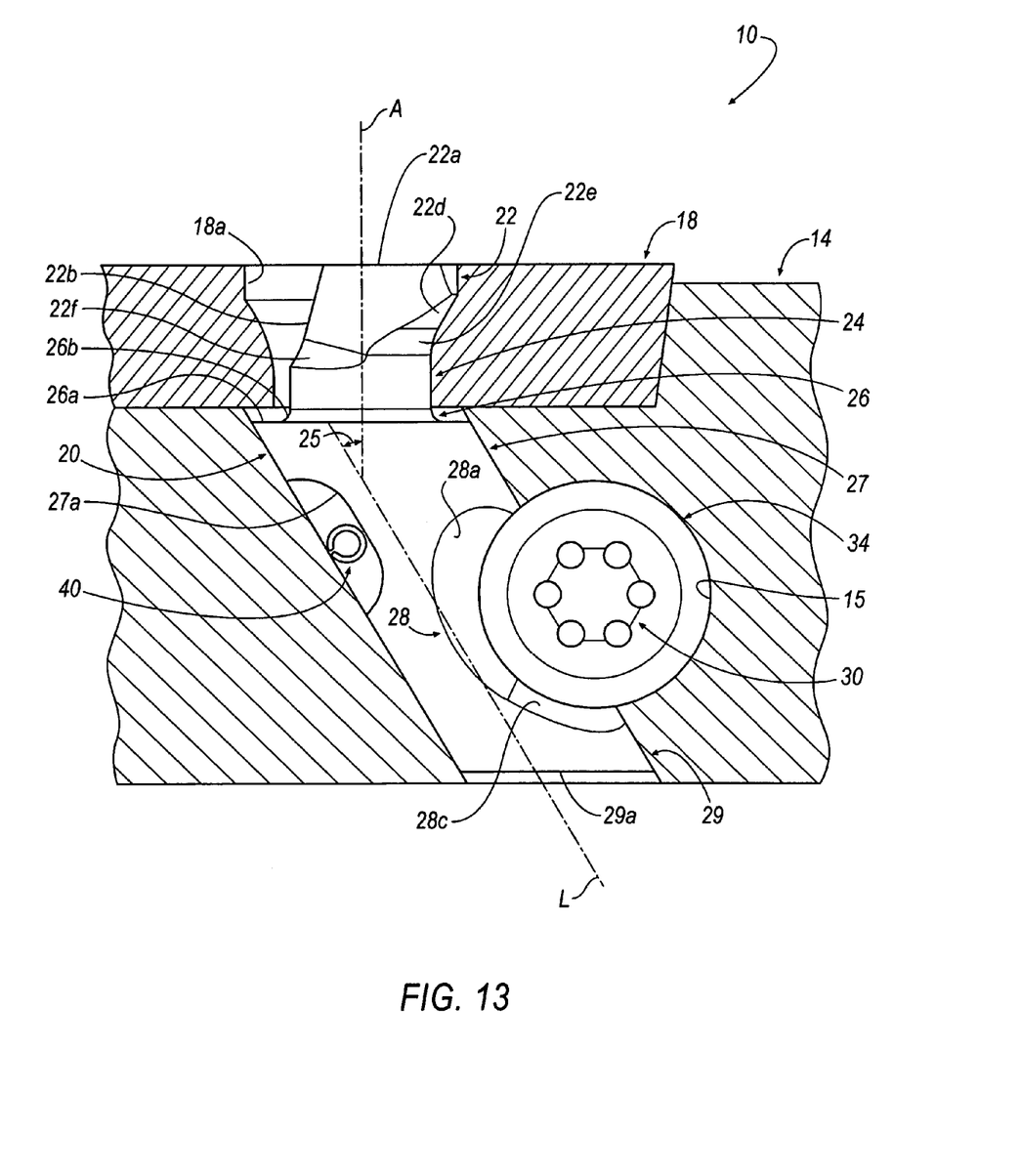
FIG. 13 is a partial cross sectional view of the clamp pin and lock screw according to an embodiment of the invention when the tool holder is in the clamped position.
Figure 14:
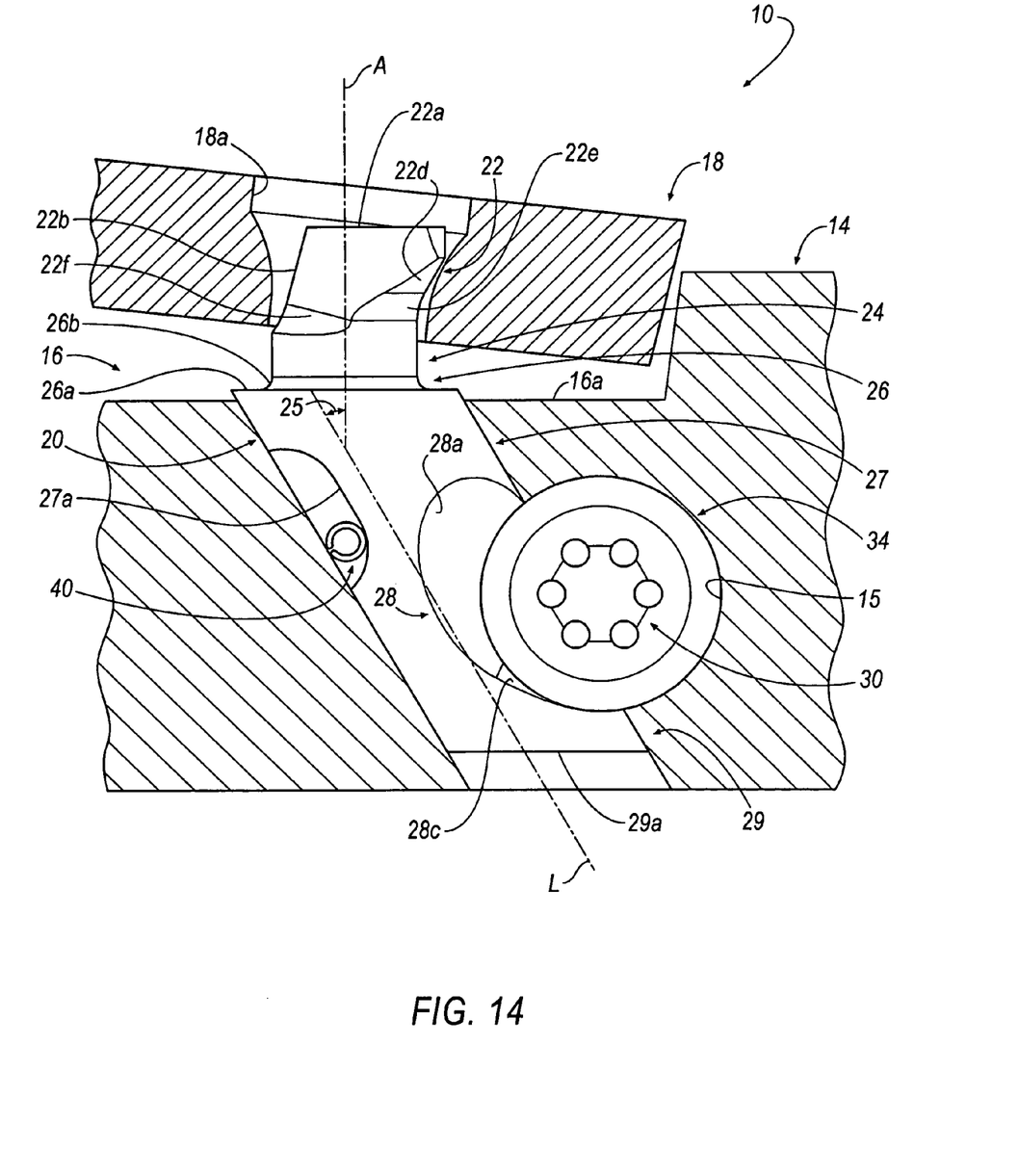
FIG. 14 is a partial cross sectional view of the clamp pin and lock screw according to an embodiment of the invention when the tool holder is in the released position.

In operation, the insert 18 is clamped against the first side surface 16b and the second side surface 16c of the insert pocket 16 by rotating the lock screw 30 so that the lock screw 30 travels longitudinally within the threaded bore 15 and transversely with respect to the clamp pin 20, as shown in FIGS. 11-14. Referring now to FIGS. 11 and 13, the tool holder 10 is in a clamped position in which the angled surface 34c of the lock screw 30 engages the angled surface 28c of the clamp pin 20 to positively secure the insert 18 against the side surfaces 16b, 16c of the insert pocket 16 of the tool holder 10. When the lock screw 30 is rotated in a first direction, for example, a counterclockwise direction, the lock screw 30 moves longitudinally from right to left (as indicated by the arrow in FIG. 11) in a transverse direction with respect to the clamp pin 20. As the lock screw 30 starts to move transversely with respect to the clamp pin 20, the angled surface 34c of the lock screw 30 no longer engages the angled surface 28c of the clamp pin 20. As the lock screw 30 continues to move transversely (to the left as viewed in FIG. 11), the angled surface 32c of the lock screw 30 will engage the angled surface 28b of the clamp pin 20. As the lock screw 30 continues to move transversely, the angled surfaces 32c and 28b act as cam surfaces to cause the clamp pin 20 to move upward and away from the insert 18 (and also upward and away from the lock screw 30). Once the clamp pin 20 travels upward as far as possible within the bore 19 of the tool holder 10 (as restricted by the stop pin 40), the tool holder 10 is in a released position, as shown in FIGS. 12, 14, and the clamp pin 20 has moved a distance 42 with respect to the clamped position. In the release position, the insert 18 can be easily removed from the tool holder 10.

To place the tool holder 10 in the clamped position from the released position, the insert 18 is placed over the clamp portion 22 of the clamp pin 20. Then, the lock screw 30 is rotated in a second, opposite direction, for example, a clockwise direction, and the lock screw 30 moves longitudinally from left to right (as indicated by the arrow in FIG. 11) in a transverse direction with respect to the clamp pin 20. As the lock screw 30 starts to move transversely with respect to the clamp pin 20, the angled surface 32c of the lock screw 30 no longer engages the angled surface 28d of the clamp pin 20. As the lock screw 30 continues to move transversely (to the right as viewed in FIG. 12), the angled surface 34c of the lock screw 30 will engage the angled surface 28c of the clamp pin 20. As the lock screw 30 continues to move transversely, the angled surfaces 34c and 28c act as cam surfaces to cause the clamp pin 20 to move downward and toward the insert 18 (and also downward and toward the lock screw 30). Once the clamp pin 20 fully engages the insert 18 and the lock screw 30 can no longer be rotated, the insert 18 positively engages first and second side surfaces 16b, 16c of the insert pocket 16, and the tool holder 10 is in the clamped position as shown in FIGS. 11, 13. In the clamped position, the insert 18 is positively secured in the tool holder 10.

In the illustrated embodiment, the angled surfaces 32c, 34c of the lock screw 30 are at an angle of approximately 40 degrees with respect to the central axis 44 of the clamp pin 20 (approximately 80 degrees with respect to each other). However, the distance and speed of the downward travel of the clamp pin 20 with respect to the lock screw 30 can be selectively adjusted by varying the relative angles between the angled surfaces 28c, 28b of the clamp pin 20 and the angled surfaces 32c, 34c of the lock screw 30. Further, the distance of upward or downward travel can be selectively adjusted by varying the distance, d, of the cutout portion 27a of the body portion 27 of the clamp pin 27.

In addition, in the illustrated embodiment shown in FIG. 6, the clamp portion 22 and barrel portion 24 of the clamp pin 20 are at an angle 26 of approximately 30 degrees with respect to the body portion 27, the cam portion 28 and nose portion 29 of the clamp pin 20. However, the distance and speed of the forward and rearward travel of the clamp pin 20 with respect to the lock screw 30 can be selectively adjusted by varying the relative angles between the clamp portion 22 and barrel portion 24 with respect to the body portion 27, the cam portion 28 and nose portion 29 of the clamp pin 20.

The tool holder 10 of the invention is designed to clamp either neutral or positive rake inserts that are currently held in place with a special screw. On some machines, this screw is not accessible. On any machine, the screw is often lost during removal. The design of the invention addresses both of these issues by allowing access from the front or back side of the tool holder 10 (one of which are accessible on all machine applications), and by having no parts which are required to separate from the tool holder 10 during insert change.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An apparatus for clamping an insert in a tool holder, comprising:
 a head portion including a first bore passing through a top surface and a bottom surface, and a second bore passing through a first side surface and a second side surface intersecting said first bore;

a clamp pin including a clamp portion and a cam portion having a first angled surface and a second angled surface, a portion of the clamp pin being positioned within said first bore; and a lock screw movably mounted within said second bore and including a first angled surface and a second angled surface for engaging said first and second angled surfaces of said clamp pin, wherein rotation of said lock screw in a first direction causes said first angled surface of said lock screw to engage said first angled surface of said clamp pin and act as a first cam surface to move said clamp portion of said clamp pin in a direction downward and toward said insert, and wherein rotation of said lock screw in a second direction causes said second angled surface of said lock screw to engage said second angled surface of said clamp pin and act as a second cam surface to move said clamp portion of said clamp pin in a direction upward and away from said insert.

2. The apparatus according to claim 1, wherein the clamp portion and the cam portion of said clamp pin are formed at an angle with respect to each other.

3. The apparatus according to claim 2, wherein said angle is approximately thirty degrees.

4. The apparatus according to claim 1, wherein said first and second angled surfaces of said clamp pin are formed at an angle of between about 20 and about 140 degrees with respect to each other.

5. The apparatus according to claim 4, wherein said angle is approximately 80 degrees.

6. The apparatus according to claim 1, wherein said first and second angled surfaces of said lock screw are formed at an angle of between about 20 and about 140 degrees with respect to each other.

7. The apparatus according to claim 6, wherein said angle is approximately 80 degrees.

8. The apparatus according to claim 1, wherein a centerline of said first bore is offset from a centerline of said second bore.

9. A clamp pin tool holder, comprising:

a head portion including an insert pocket for receiving an insert;

a clamp pin including a clamp portion and a cam portion having a first angled surface and a second angled surface, a portion of the clamp pin being positioned within a bore of said head portion; and a lock screw rotatably mounted to said head portion, said lock screw including a first angled surface and a second angled surface for engaging said first and second angled surfaces of said clamp pin, wherein rotation of said lock screw in a first direction causes relative movement between said clamp pin and said lock screw such that said first angled surface of said lock screw engages said first angled surface of said clamp pin and moves said clamp portion of said clamp pin downward and toward said insert, thereby placing said tool holder in a clamped position and wherein rotation of said lock screw in a second, opposite direction causes relative movement between said clamp pin and said lock screw such that said second angled surface of said lock screw engages said second angled surface of said clamp pin and moves said clamp portion of said clamp pin in a direction upward and away from said insert, thereby placing said tool holder in a released position.

10. The apparatus according to claim 9, wherein the clamp portion and the cam portion of said clamp pin are formed at an angle with respect to each other.

11. The apparatus according to claim 10, wherein said angle is approximately thirty degrees.

12. The apparatus according to claim 9, wherein said first and second angled surfaces of said clamp pin are formed at an angle of between about 20 and about 140 degrees with respect to each other.

13. The apparatus according to claim 12, wherein said angle is approximately 80 degrees.

14. The apparatus according to claim 9, wherein said first and second angled surfaces of said lock screw are formed at an angle of between about 20 and about 140 degrees with respect to each other.

15. The apparatus according to claim 14, wherein said angle is approximately 80 degrees.

16. A device for clamping an insert within an insert pocket of a tool holder, comprising:

a head portion;

a clamp pin including a clamp portion and a cam portion having a first angled surface and a second angled surface, a portion of the clamp pin being positioned within a bore of said head portion; and a lock screw rotatably mounted to said head portion, said lock screw including a first angled surface for engaging said angled surface of said clamp pin, and a second angled surface for engaging said second angled surface of said clamp pin, wherein rotation of said lock screw in a first direction causes said lock screw to move in a transverse direction with respect to said clamp pin such that said at least one angled surface of said lock screw engages said at least one angled surface of said clamp pin to move said clamp pin relative to said insert, thereby placing said device in one of a released position and a clamped position, and wherein rotation of said lock screw in a second direction causes said lock screw to move in an opposite transverse direction with respect to said clamp pin such that said second angled surface of said lock screw engages said second angled surface of said clamp pin to move said clamp portion of said clamp pin in an opposite direction relative to said insert.

17. The device according to claim 16, wherein the clamp portion and the cam portion of said clamp pin are formed at an angle with respect to each other.

18. The apparatus according to claim 16, wherein said at least one angled surface of said clamp pin is formed at an angle with respect to a longitudinal axis, L, of said clamp pin.

19. The apparatus according to claim 18, wherein said at least one angled surface of said lock screw is formed at an angle that is substantially identical to the angle of said at least one angled surface of said clamp pin.

* * * * *